US010438296B2

(12) United States Patent
Dintenfass et al.

(10) Patent No.: US 10,438,296 B2
(45) Date of Patent: Oct. 8, 2019

(54) SYSTEM FOR ANALYZING HISTORICAL EVENTS TO DETERMINE POTENTIAL CATALYSTS AND AUTOMATICALLY GENERATING AND IMPLEMENTING MITIGATION

(71) Applicant: Bank of America Corporation, Charlotte, NC (US)

(72) Inventors: Katherine Dintenfass, Lincoln, RI (US); Victoria L. Dravneek, Charlotte, NC (US); Matthew Hsieh, Charlotte, NC (US); Wade Travis Hobbs, Mooresville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 266 days.

(21) Appl. No.: 15/296,891

(22) Filed: Oct. 18, 2016

(65) Prior Publication Data

US 2018/0040072 A1 Feb. 8, 2018

Related U.S. Application Data (60) Provisional application No. 62/372,118, filed on Aug. 8, 2016.

(51) Int. Cl.
*G06Q 40/00* (2012.01)
*G06Q 40/02* (2012.01)

(52) U.S. Cl.
CPC ............ *G06Q 40/12* (2013.12); *G06Q 40/02* (2013.01)

(58) Field of Classification Search
CPC ................ G06Q 40/12; G06Q 40/02
See application file for complete search history.

(56) References Cited

U.S. PATENT DOCUMENTS

| 5,313,571 A | * | 5/1994 | Hirose | G06T 11/206 345/440 |
| 5,875,437 A | * | 2/1999 | Atkins | G06Q 20/102 705/40 |

(Continued)

OTHER PUBLICATIONS

Jordan, Arthur. "Database Marketing Builds on Relationships with Members," Credit Union Ne Credit Union News, (May 5, 1995), vol. 15, Issue 9, p. 11.

(Continued)

*Primary Examiner* — Ashford S Hayles
(74) *Attorney, Agent, or Firm* — Michael A. Springs; Moore & Van Allen PLLC; James C. Edwards (57) ABSTRACT

Embodiments analyze historical events to determine potential catalysts and automatically generate and implement mitigation of issues by determining a potential issue with a customer's finances based on historical event data; correlating the potential issue with one or more causes of the potential issue; and, in response to the correlation, initiating mitigation of the issue. In some cases, embodiments rank the possible causes of the potential issue; and present the possible causes to the customer for consideration. In some cases, embodiments receive the customer's confirmation of the possible causes. In some cases, embodiments initiate communication of one or more recommendations for mitigating the potential issue to the customer, receive the customer's approval of at least one recommendation; and initiate mitigation of the issue based on the at least one approved recommendation.

18 Claims, 3 Drawing Sheets

(56) References Cited

U.S. PATENT DOCUMENTS

| | | | |
|---|---|---|---|
| 5,930,764 A | 7/1999 | Melchione et al. | |
| 6,009,415 A | 12/1999 | Shurling et al. | |
| 6,073,110 A | 6/2000 | Rhodes et al. | |
| 6,088,686 A | 7/2000 | Walker et al. | |
| 6,119,103 A * | 9/2000 | Basch | G06Q 20/341 705/35 |
| 6,513,018 B1 | 1/2003 | Culhane | |
| 6,532,450 B1 * | 3/2003 | Brown | G06Q 20/00 705/40 |
| 6,901,406 B2 | 5/2005 | Nabe et al. | |
| 7,263,527 B1 * | 8/2007 | Malcolm | G06Q 30/02 705/30 |
| 7,552,087 B2 * | 6/2009 | Schultz | G06Q 20/0453 705/38 |
| 7,805,363 B2 | 9/2010 | Haggerty et al. | |
| 7,873,566 B1 | 1/2011 | Templeton et al. | |
| 7,921,048 B2 | 4/2011 | Sloan et al. | |
| 8,027,891 B2 * | 9/2011 | Preston | G06Q 40/00 705/30 |
| 8,234,194 B2 | 7/2012 | Mele et al. | |
| 8,255,316 B2 | 8/2012 | Bal et al. | |
| 8,271,364 B2 | 9/2012 | Nobili et al. | |
| 8,296,229 B1 * | 10/2012 | Yellin | G06Q 40/00 705/39 |
| 8,380,623 B1 * | 2/2013 | Ley | G06Q 40/02 705/39 |
| 8,533,082 B1 * | 9/2013 | Sudjianto | G06Q 40/025 705/35 |
| 8,666,836 B2 | 3/2014 | Adams | |
| 8,719,132 B1 * | 5/2014 | Diggdon | G06Q 20/405 705/35 |
| 8,732,004 B1 | 5/2014 | Ramos et al. | |
| 2001/0023402 A1 * | 9/2001 | Flynn | G06Q 30/016 705/304 |
| 2002/0095363 A1 * | 7/2002 | Sloan | G06Q 40/02 705/36 R |
| 2002/0147669 A1 | 10/2002 | Taylor et al. | |
| 2003/0009402 A1 * | 1/2003 | Mullen | G06Q 20/04 705/35 |
| 2004/0225567 A1 * | 11/2004 | Mitchell | G06Q 20/0453 705/16 |
| 2005/0044017 A1 | 2/2005 | Foss, Jr. et al. | |
| 2005/0055275 A1 | 3/2005 | Newman et al. | |
| 2005/0137953 A1 * | 6/2005 | McDonough | G06Q 40/06 705/36 R |
| 2006/0224475 A1 * | 10/2006 | Kramer | G06Q 40/00 705/30 |
| 2007/0005477 A1 * | 1/2007 | McAtamney | G06F 3/04845 705/35 |
| 2007/0174163 A1 * | 7/2007 | Griffin | G06Q 40/00 705/35 |
| 2007/0219875 A1 | 9/2007 | Toulotte | |
| 2007/0260532 A1 * | 11/2007 | Blake, III | G06Q 40/00 705/35 |
| 2008/0033876 A1 * | 2/2008 | Goldman | G06Q 20/108 705/42 |
| 2008/0046347 A1 * | 2/2008 | Smith | G06Q 20/14 705/30 |
| 2008/0215455 A1 * | 9/2008 | Leggett | G06Q 30/00 705/26.44 |
| 2008/0245854 A1 * | 10/2008 | Monden | G06Q 40/02 235/379 |
| 2009/0030819 A1 * | 1/2009 | VanLeeuwen | G06Q 40/00 705/35 |
| 2009/0048957 A1 * | 2/2009 | Celano | G06Q 40/00 705/35 |
| 2009/0083638 A1 | 3/2009 | Gupta | |
| 2009/0204938 A1 * | 8/2009 | Schindler | G06F 8/10 717/105 |
| 2009/0228381 A1 * | 9/2009 | Mik | G06Q 20/04 705/34 |
| 2009/0271287 A1 * | 10/2009 | Halpern | G06Q 20/10 705/26.1 |
| 2009/0276368 A1 * | 11/2009 | Martin | G06Q 40/02 705/36 R |
| 2010/0095235 A1 * | 4/2010 | Bennett | G06Q 99/00 715/781 |
| 2010/0162152 A1 * | 6/2010 | Allyn | G06F 3/0481 715/767 |
| 2010/0257066 A1 * | 10/2010 | Jones | G06Q 20/202 705/17 |
| 2010/0257094 A1 * | 10/2010 | Kumar | G06F 9/547 705/40 |
| 2010/0268629 A1 * | 10/2010 | Ross | G06Q 10/10 705/35 |
| 2010/0274830 A1 * | 10/2010 | Stever | G06F 3/0482 708/132 |
| 2010/0306095 A1 * | 12/2010 | Olson | G06Q 10/04 705/35 |
| 2011/0071886 A1 * | 3/2011 | Schnur | G06Q 10/04 705/7.38 |
| 2011/0106691 A1 * | 5/2011 | Clark | G06Q 40/025 705/38 |
| 2011/0107265 A1 * | 5/2011 | Buchanan | G06Q 30/02 715/835 |
| 2011/0166979 A1 * | 7/2011 | Zoldi | G06Q 10/0635 705/35 |
| 2011/0178908 A1 * | 7/2011 | Benefield | G06Q 40/00 705/35 |
| 2011/0184822 A1 * | 7/2011 | Matkovic | G06Q 20/202 705/18 |
| 2011/0320294 A1 * | 12/2011 | Votaw | G06Q 20/10 705/17 |
| 2011/0320325 A1 * | 12/2011 | Preston | G06Q 40/00 705/30 |
| 2012/0016817 A1 | 1/2012 | Smith et al. | |
| 2012/0053987 A1 * | 3/2012 | Satyavolu | G06Q 30/0201 705/7.29 |
| 2012/0130869 A1 * | 5/2012 | Shergill | G06Q 40/02 705/30 |
| 2012/0130870 A1 * | 5/2012 | Shergill | G06Q 40/02 705/30 |
| 2012/0150736 A1 * | 6/2012 | Dickerson | G06Q 20/102 705/40 |
| 2012/0191596 A1 * | 7/2012 | Kremen | G06Q 40/02 705/38 |
| 2012/0221446 A1 * | 8/2012 | Grigg | G06Q 30/04 705/30 |
| 2012/0240064 A1 * | 9/2012 | Ramsay | G06T 11/00 715/762 |
| 2012/0278148 A1 * | 11/2012 | Clemmons | G06Q 30/02 705/14.17 |
| 2013/0006824 A1 * | 1/2013 | Maisonneuve | G06Q 30/0241 705/35 |
| 2013/0013469 A1 * | 1/2013 | Krakowiecki | G06Q 40/12 705/30 |
| 2013/0030994 A1 * | 1/2013 | Calman | G06Q 30/02 705/40 |
| 2013/0041819 A1 * | 2/2013 | Khasho | G06Q 40/02 705/42 |
| 2013/0054460 A1 * | 2/2013 | Hanson | G06Q 40/02 705/44 |
| 2013/0103580 A1 * | 4/2013 | Ventura | G06Q 40/02 705/40 |
| 2013/0106708 A1 * | 5/2013 | Mudu | G06T 11/206 345/173 |
| 2013/0106830 A1 * | 5/2013 | de Loera | G06T 11/206 345/419 |
| 2013/0138554 A1 * | 5/2013 | Nikankin | G06Q 40/02 705/38 |
| 2013/0191194 A1 * | 7/2013 | Shreibati | G06Q 40/06 705/14.12 |
| 2013/0238487 A1 * | 9/2013 | Biske | G06Q 40/02 705/39 |
| 2013/0290072 A1 * | 10/2013 | Ren | G06Q 10/0637 705/7.36 |

(56) References Cited

U.S. PATENT DOCUMENTS

| | | | |
|---|---|---|---|
| 2014/0006198 A1* | 1/2014 | Daly | G06Q 30/06 705/24 |
| 2014/0012722 A1* | 1/2014 | Keld | G06O 10/087 705/35 |
| 2014/0019317 A1* | 1/2014 | Casares | G06Q 30/06 705/30 |
| 2014/0021252 A1* | 1/2014 | Brennan | G06Q 20/405 235/380 |
| 2014/0074688 A1* | 3/2014 | Shvarts | G06Q 40/02 705/38 |
| 2014/0244006 A1* | 8/2014 | Lee | G05B 23/0272 700/83 |
| 2014/0258022 A1* | 9/2014 | Zamer | G06Q 30/0631 705/26.7 |
| 2014/0279302 A1* | 9/2014 | Akin | G06Q 40/10 705/30 |
| 2014/0310142 A1* | 10/2014 | Mak | G06Q 40/02 705/35 |
| 2014/0324448 A1* | 10/2014 | Lacy | G06Q 50/22 705/2 |
| 2014/0344128 A1* | 11/2014 | Nikankin | G06Q 40/00 705/35 |
| 2014/0379272 A1 | 12/2014 | Sathe | |
| 2015/0032598 A1* | 1/2015 | Fleming | G06Q 40/025 705/38 |
| 2015/0073952 A1* | 3/2015 | Ventura | G06Q 40/12 705/30 |
| 2015/0170175 A1* | 6/2015 | Zhang | G06Q 30/0204 705/7.33 |
| 2015/0206055 A1 | 7/2015 | Sengupta et al. | |
| 2016/0027102 A1* | 1/2016 | Smith | G06O 40/00 705/35 |
| 2016/0071200 A1* | 3/2016 | Lee | G06Q 40/00 705/35 |
| 2016/0098327 A1* | 4/2016 | Detienne | H04L 67/142 714/4.2 |
| 2016/0103886 A1* | 4/2016 | Prophete | G06F 16/248 707/722 |
| 2016/0125408 A1* | 5/2016 | Crawford | G06Q 20/405 705/34 |
| 2016/0210701 A1* | 7/2016 | Kinsey | G06Q 10/06 |
| 2016/0335724 A1* | 11/2016 | Mak | G06Q 40/06 |
| 2016/0338072 A1* | 11/2016 | Cohen | H04L 12/283 |
| 2017/0076379 A1* | 3/2017 | Wadley | G06Q 40/06 |
| 2017/0091851 A1* | 3/2017 | Snow | G06Q 30/0633 |
| 2017/0124541 A1* | 5/2017 | Aggarwal | G06Q 20/102 |
| 2017/0195994 A1* | 7/2017 | Cole | G06Q 40/02 |
| 2017/0374092 A1* | 12/2017 | Carter | H04L 63/1433 |
| 2018/0101860 A1* | 4/2018 | Fleming | G06Q 30/0239 |

OTHER PUBLICATIONS

Snyder, Daniel. "From List Fatigue to Relationship Marketing; The Credit Card Industry Reassesses its Direct Mail Strategies," CreditWorld, (N CreditWorld, (Nov./Dec. 1997), p. 27.

"Putting Customer Benefit First to Provide Faster ROI SAS Institutes Data Warehousing Practice Solves Business Problems" Business Wire, (May 19, 1998), p. 1.

\* cited by examiner

SYSTEM FOR ANALYZING HISTORICAL EVENTS TO DETERMINE POTENTIAL CATALYSTS AND AUTOMATICALLY GENERATING AND IMPLEMENTING MITIGATION

FIELD

In general, embodiments of the invention relate to methods, systems, apparatus and computer program products for analyzing historical events to determine potential catalysts and implementing mitigation.

BACKGROUND

Oftentimes, a potential problem may exist with a customer's finances of which the customer may not be aware.

Therefore, a need exists for a system that can identify problems so that the system may communicate and/or implement recommendations to/for the customer.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later. Some embodiments of the present invention provide Embodiments of the invention provide systems, computer program products, methods and apparatuses for analyzing historical events to determine potential catalysts and automatically generating and implementing mitigation.

Some embodiments provide a system including a computer apparatus including a processor, a memory device, and a communication device; and a software module stored in the memory, comprising computer-readable instructions that when executed by the processor cause the processor to determine a potential issue with a customer's finances based on historical event data; correlate the potential issue with one or more causes of the potential issue; and, in response to the correlation, initiate mitigation of the issue.

In some embodiments, the computer-readable instructions when executed by the processor further cause the processor to rank the possible causes of the potential issue; and present the possible causes to the customer for consideration.

In some such embodiments, the computer-readable instructions that when executed by the processor cause the processor to receive the customer's confirmation of the possible causes.

In some embodiments, the computer-readable instructions that when executed by the processor cause the processor to initiate communication of one or more recommendations for mitigating the potential issue to the customer. In some such embodiments, the computer-readable instructions that when executed by the processor cause the processor to receive the customer's approval of at least one recommendation; and initiate mitigation of the issue based on the at least one approved recommendation.

In some embodiments, the computer-readable instructions that when executed by the processor cause the processor to collect data corresponding to the customer; and apply a correlation algorithm to the collected data to establish at least one nexus between the collected data and the potential issue, wherein the correlation algorithm is configured to determine whether circumstances corresponding to the collected data are likely to cause the potential issue, thereby resulting in at least one likelihood of causation each corresponding to only one of the at least nexuses and a collected-data-potential-issue pair and a level of causation corresponding to all of the at least one nexuses and the collected-data-potential-issue pair.

In some such embodiments, the likelihood of causation corresponds to one of the at least one nexuses and the level of causation represents a combination of each of the at least one likelihoods of causation.

A computer program product for analyzing historical events to determine potential catalysts and automatically generating and implementing mitigation, the computer program product comprising at least one non-transitory computer-readable medium having computer-readable program code portions embodied therein, the computer-readable program code portions comprising an executable portion configured to determine a potential issue with a customer's finances based on historical event data; an executable portion configured to correlate the potential issue with one or more causes of the potential issue; and an executable portion configured to, in response to the correlation, initiate mitigation of the issue.

In some embodiments, the computer-readable program code portions further comprise an executable portion configured to rank the possible causes of the potential issue; and an executable portion configured to present the possible causes to the customer for consideration. In some such embodiments, the computer-readable program code portions further comprise an executable portion configured to receive the customer's confirmation of the possible causes.

In some embodiments, the computer-readable program code portions further comprise an executable portion configured to initiate communication of one or more recommendations for mitigating the potential issue to the customer. In some such embodiments, the computer-readable program code portions further comprise an executable portion configured to receive the customer's approval of at least one recommendation; and an executable portion configured to initiate mitigation of the issue based on the at least one approved recommendation.

In some embodiments, the computer-readable program code portions further comprise an executable portion configured to collect data corresponding to the customer; and an executable portion configured to apply a correlation algorithm to the collected data to establish at least one nexus between the collected data and the potential issue, wherein the correlation algorithm is configured to determine whether circumstances corresponding to the collected data are likely to cause the potential issue, thereby resulting in at least one likelihood of causation each corresponding to only one of the at least nexuses and a collected-data-potential-issue pair and a level of causation corresponding to all of the at least one nexuses and the collected-data-potential-issue pair.

In some embodiments, the likelihood of causation corresponds to one of the at least one nexuses and the level of causation represents a combination of each of the at least one likelihoods of causation.

According to embodiments of the invention, a method for analyzing historical events to determine potential catalysts and automatically generating and implementing mitigation. The method includes determining, by a computer processing device, a potential issue with a customer's finances based on historical event data; correlating, by the computer processing device, the potential issue with one or more causes of the potential issue; and, in response to the correlation, initiating, by the computer processing device, mitigation of the issue.

In some embodiments, the method includes ranking the possible causes of the potential issue; and presenting the possible causes to the customer for consideration. In some such embodiments, the method also includes receiving the customer's confirmation of the possible causes.

In some embodiments, the method includes initiating communication of one or more recommendations for mitigating the potential issue to the customer.

In some embodiments, the method includes receiving the customer's approval of at least one recommendation; and initiating mitigation of the issue based on the at least one approved recommendation.

In some embodiments, the method includes collecting data corresponding to the customer; and applying a correlation algorithm to the collected data to establish at least one nexus between the collected data and the potential issue, wherein the correlation algorithm is configured to determine whether circumstances corresponding to the collected data are likely to cause the potential issue, thereby resulting in at least one likelihood of causation each corresponding to only one of the at least nexuses and a collected-data-potential-issue pair and a level of causation corresponding to all of the at least one nexuses and the collected-data-potential-issue pair, where the likelihood of causation corresponds to one of the at least one nexuses and the level of causation represents a combination of each of the at least one likelihoods of causation The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the invention provide a technical improvement over existing technology in the data gathering, analysis and problem mitigation fields of art by enabling a spoke and hub environment whereby spoke systems and their connections with a hub system provide for intelligent collection of customer data, such as historical customer transaction data. For example, customer data may come from a variety of disparate sources, servers, systems and the like. In various embodiments, multiple channels or only one channel is used for data moving from its source to its destination at a "hub" that collects, and in some cases, analyzes the data. In some cases, only those channels with relevant information are used. This may be determined based on user input or based on communications from spoke control systems such as a business group's server sending instructions to the hub system to configure and/or activate a communication channel with a spoke system so that relevant information may be communicated across the channel. In some cases, when the spoke control system detects that new information or otherwise relevant information may be available at one or more spoke systems, the spoke control system sends control signals that cause the hub system to establish a dedicated communication channel between the hub system and the one or more spoke systems that may have relevant information. In some cases, the dedicated communication channel is optimized so that the information may be communicated more efficiently than is could be over a non-dedicated communication channel. For example, a non-dedicated communication channel may utilize insecure network connections or systems or may utilize unstable or noise-prone network connections or systems. Thus, when establishing a dedicated communication channel, the hub system may optimize parameters of the dedicated communication channel such that the communication channel is less prone to interruption from security breach, other traffic, offline systems or the like. This may be done by, for example, designating certain systems on the network between the hub system and the various spoke systems, respectively, as low-functioning, medium-functioning, or high-functioning network systems/hubs/connections/channels (collectively referred to as network systems). In various other embodiments, the number of categories of systems may be raised or lowered. For example, there may be five (5) distinct categories of systems. The various network systems may be categorized by one or more administrators and/or automatically based on one or more monitoring modules or applications running on the hub and/or spoke systems. Such a monitoring system may flag any abnormalities in network communication such as an unintended offline network system, a security breach of a network system, a network communication affected negatively by noise or interference (in some cases based on a predetermined threshold of interference or communication errors). Thus, once various network systems are categorized, the spoke control systems and/or the hub system may optimize the dedicated communication channel by selecting appropriately categorized network systems for the communication channel. For example, the hub system may establish a dedicated communication channel in order to receive information associated with high priority work (as indicated by a spoke control system, for example, in its control signals to the hub system). When establishing the dedicated communication channel, the hub system may only select high-functioning network systems in order to ensure that the high priority information may be reliably communicated from the spoke system(s) to the hub system. In another example, certain spoke systems are designated or categorized and always provided a dedicated (or non-dedicated) communication channel based on their respective categorization.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Although embodiments of the present invention described herein are generally described as involving a merchant, it will be understood that the merchant may involve one or more persons, organizations, businesses, institutions and/or other entities such as financial institutions, services providers etc. that implement one or more portions of one or more of the embodiments described and/or contemplated herein.

It will be understood that "point-of-sale transaction" and "POS transaction" as used herein, generally refers to any exchange of goods or services for money. Such transactions include, but are not limited, to transactions involving ATM cards, debit cards, credit cards and the like. While point-of-sale transactions often involve the immediate withdrawal of funds from the purchaser's available funds, as used herein, point-of-sale transactions may also include credit transactions.

Embodiments of the invention track historical trends of the customer in order to assist the customer in identifying the reasons for changes in the customer's finances, such as an increase in the customer's expenses. The invention may determine that the customer's expenses have risen 20%, and the invention may scour available data to determine the causes for the increase. The available data may include, but is not limited to, financial transaction data including personal information and transaction activity, device data, calendar data and/or social media data. Embodiments of the invention may also push to the customer recommendations for correcting any correctible problems or notify the customer that the increased expenses are due to some identified circumstances. In some cases, the application may determine that those similarly situated have increased expenses at a different rate than the customer, and may provide recommendations for how the customer might reduce the expenses to better correspond to the other similarly situated customers. The invention may identify any existing trends (particular to the customer or otherwise), that could be leveraged to assist the customer financially and push information about those trends and, in some cases, recommendations for capitalizing on such trends. In some embodiments, the invention enables automatic mitigation of the identified problems.

More specifically, embodiments analyze historical events to determine potential catalysts and automatically generate and implement mitigation of issues by determining a potential issue with a customer's finances based on historical event data; correlating the potential issue with one or more causes of the potential issue; and, in response to the correlation, initiating mitigation of the issue. In some cases, embodiments rank the possible causes of the potential issue; and present the possible causes to the customer for consideration. In some cases, embodiments receive the customer's confirmation of the possible causes. In some cases, embodiments initiate communication of one or more recommendations for mitigating the potential issue to the customer, receive the customer's approval of at least one recommendation; and initiate mitigation of the issue based on the at least one approved recommendation.

Some embodiments collect data corresponding to the customer; and apply a correlation algorithm to the collected data to establish at least one nexus between the collected data and the potential issue, wherein the correlation algorithm is configured to determine whether circumstances corresponding to the collected data are likely to cause the potential issue, thereby resulting in at least one likelihood of causation each corresponding to only one of the at least one nexuses and a collected-data-potential-issue pair and a level of causation corresponding to all of the at least one nexuses and the collected-data-potential-issue pair. The likelihood of causation corresponds to one of the at least one nexuses and the level of causation represents a combination of each of the at least one likelihoods of causation.

The embodiments described herein may refer to use of a transaction or transaction event to trigger analysis of the customer's data, in order to identify any potential problems. In various embodiments, occurrence of a transaction also triggers the sending of information such as recommendations and/or automatic initiation of mitigation, which may be based on the recommendations or otherwise. Unless specifically limited by the context, a "transaction" refers to any communication between the user and the financial institution or other entity monitoring the user's activities. In some embodiments, for example, a transaction may refer to a purchase of goods or services, a return of goods or services, a payment transaction, a credit transaction, or other interaction involving a user's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device (e.g., Nintendo Wii®, PlayStation Portable®, etc.), and/or various combinations of the foregoing.

In some embodiments, a point-of-transaction device is operated in a public place (e.g., on a street corner, at the doorstep of a private residence, in an open market, at a public rest stop, etc.). In other embodiments, the point-of-transaction device is additionally or alternatively operated in a place of business (e.g., in a retail store, post office, banking center, grocery store, factory floor, etc.). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, etc.). In yet other embodiments, the point-of-transaction device is owned by the financial institution offering the point-of-transaction device providing functionality in accordance with embodiments of the invention described herein.

In the various embodiments discussed herein, the user or customer is allowed to opt-in before receiving recommendations for mitigation of potential problems. Specifically, some embodiments of the invention describe recommendations being sent to audience targeted due to his/her potential financial issues. The recipients of some or all communications, which in some instances are or include recommendations and/or advertisements, have "opted-in" to receive such messages. Opting-in, in some embodiments, may include explicit input provided by the recipient or potential recipient to receive specific types of messages, while excluding other types of messages, or may include acceptance of any and all types of communications described herein. Such recipient input may be provided by the recipient in response to a prompt from the sender of the information, communications and/or messages. The prompt may be communicated to the recipient in response to the recipient entering a predetermined geographic area. In some embodiments, the recipient may pre-emptively opt-in using an online banking interface, such as a financial institution and/or merchant website. In some embodiments, the user or recipient is sent a communication requesting input regarding opting-into the recommendation program once the user or recipient has been identified as potentially having a problem, for example, higher trending of expenses of the customer.

Figure 1:
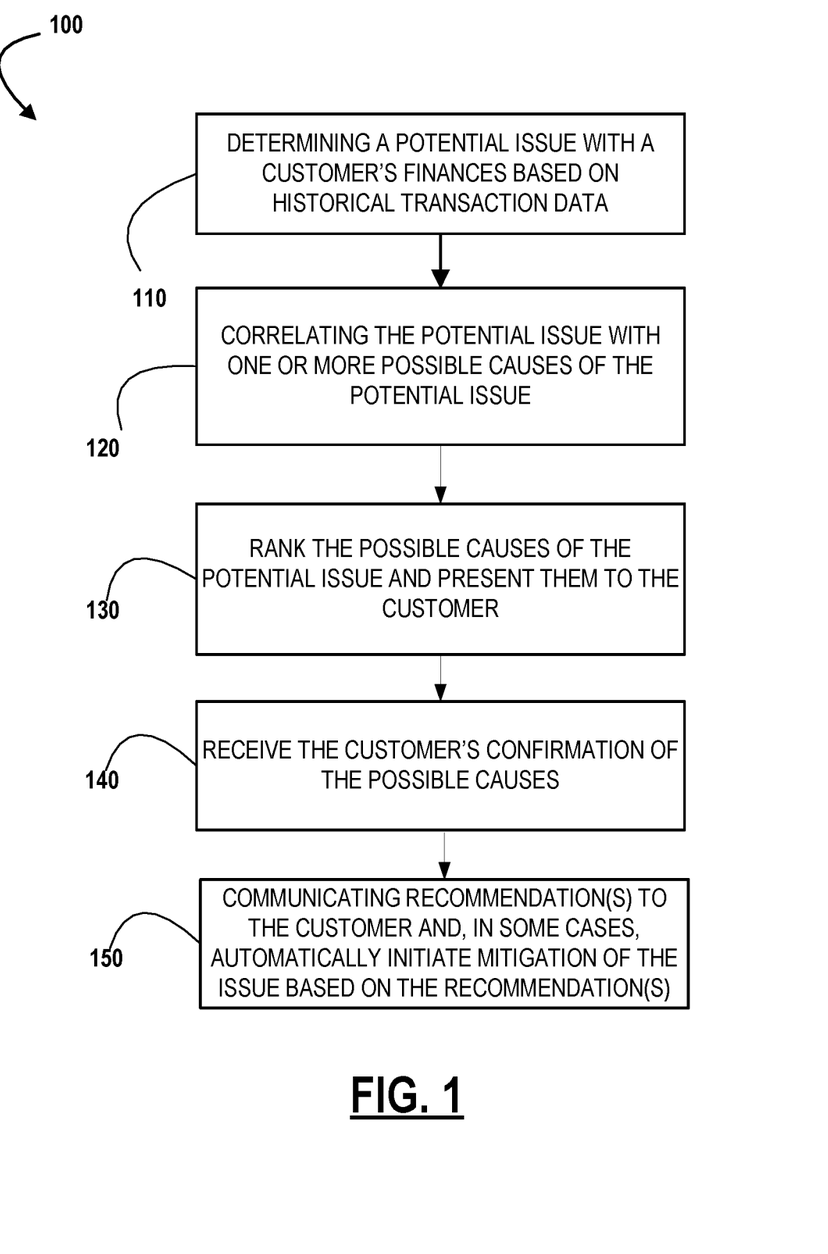
FIG. 1 provides a flow diagram illustrating a process flow for analyzing historical events to determine potential catalysts and automatically generating and implementing mitigation, in accordance with embodiments of the present invention.

Referring now to FIG. 1, an illustration of a general process flow 100 for analyzing historical events to determine potential catalysts and automatically generating and implementing mitigation according to embodiments of the invention is shown. The first step, as represented by block 110, is to determine a potential issue with a customer's finances exists. In some embodiments, this may be based on historical transaction data. Examples of issue or problems may include trends toward increasing expenses, trends toward increasing expenses in one or more specific merchant categories, or, if such granular data is available, trends towards increasing expenses for particular products or types of products. Other types of potential problems may include trends of lowering income, trends of lowering savings, trends of multiple large purchases, and the like.

Next, as represented by block 120, the system correlates the potential issue (aka problem) with one or more possible causes of the potential issue. Then, as represented by block 130, the system ranks the possible causes of the potential issue and, in some embodiments, presents them to the customer. Next, as represented by block 140, in some embodiments, the system receives the customer's confirmation of the possible causes of the issue. Finally, as represented by block 150, the system may, in some embodiments, communicate one or more recommendations to the customer. In some cases, the system may automatically initiate mitigation of the issue based on the recommendation(s).

Figure 2:
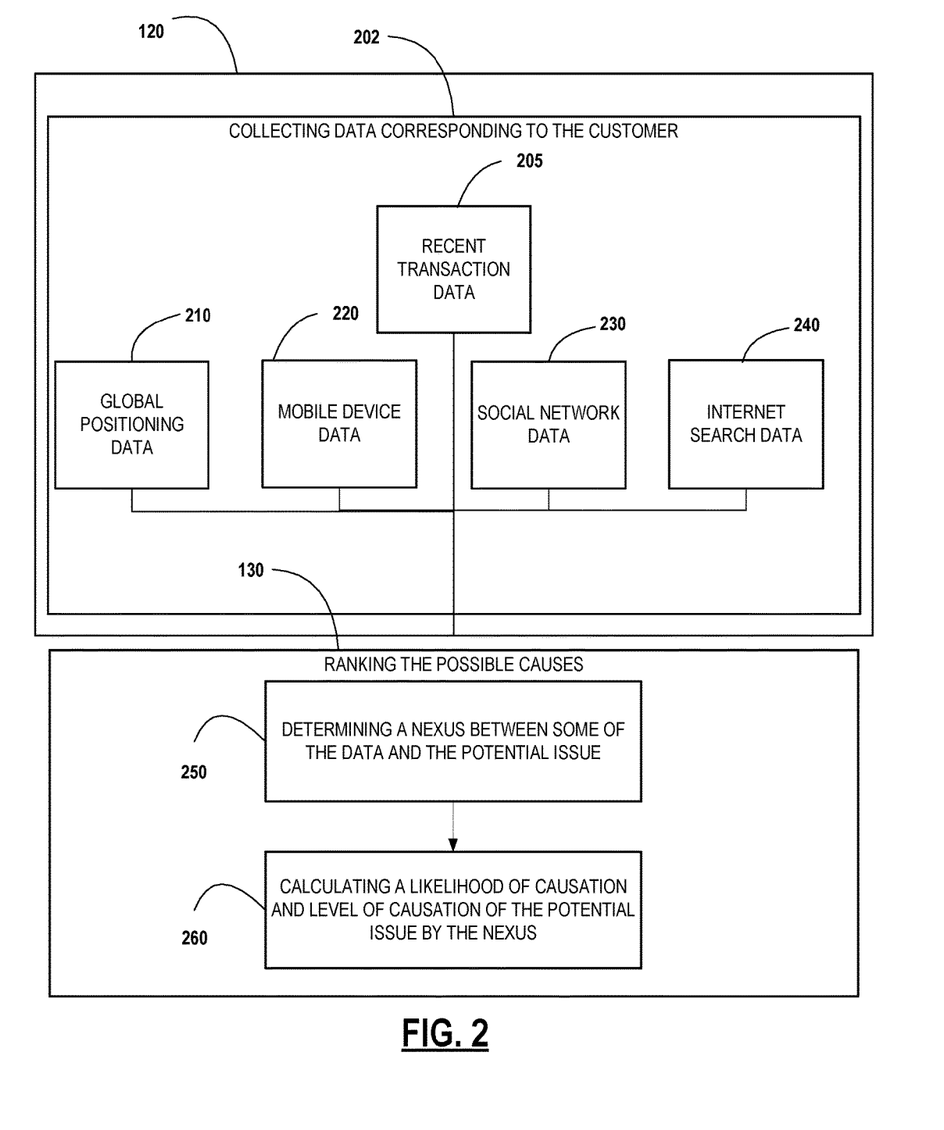
FIG. 2 provides a flow diagram illustrating a process flow for analyzing historical events to determine potential catalysts and automatically generating and implementing mitigation, in accordance with embodiments of the present invention.

Referring now to FIG. 2, a diagram illustrates additional details of the process described with reference to FIG. 1. As shown, step 120 may include collecting data corresponding to the customer, as represented by sub-block 202. Sub-block 202 may include data from a variety of source such as recent transaction data, as represented by block 205, global positioning data, as represented by block 210, mobile device data, as represented by block 220, social network data, as represented by block 230, Internet search data, as represented by block 240, and/or the like.

Furthermore, as shown, step 130 may include determining a nexus between some of the data and the potential issue, as represented by block 250, and calculating a likelihood of causation and a level of causation of the potential issue by the nexus, as represented by block 260. Determining a nexus, in some embodiments, is based on one or more of the above-noted types of data. In some embodiments, the system applies a correlation algorithm to the collected data to establish at least one nexus between the collected data and the potential issue. In some embodiments, the correlation algorithm is configured to determine whether circumstances corresponding to the collected data are likely to cause the potential issue, thereby resulting in at least one likelihood of causation. A "likelihood of causation" may correspond to only one of the at least one nexuses as well as a collected-data-potential-issue pair. Furthermore, the correlation algorithm may be configured to determine a level of causation. The "level of causation" may correspond to a combination of all of the nexuses and all the collected-data-potential-issue pairs. Thus, in some embodiments, the level of causation may be a summation or variation on a summation of each of the likelihoods of causation. For example, if a collected-data-potential-issue pair has multiple potential nexuses with the potential issue, then each of the multiple nexuses will have a corresponding likelihood of causation, which may be combined (e.g., summed) to determine the overall level of causation of the collected-data-potential-issue pair. Thus, each pair may be compared and ranked. Then, the system may determined recommendations to mitigate the highest ranked pair. For example, if the collected data indicates a trend of rising expenses and the level of causation is high for those expenses being caused by an increase in dining out during the week, then the system may develop recommendations configured for mitigating the customer's amount of weekday dining out. For example, the system may recommend that the customer carry her lunch to work or subscribe to a grocery delivery service. In some instances, the mitigation may be automatically carried out if possible, such as automatically enrolling the customer in the grocery delivery service; provided, however, the customer logs onto the account and specifies desired groceries for purchase. In cases where item-level data is available to the system based on historical grocery purchases, then the system may automatically enroll the customer (or perhaps upon a "one-click" authorization from the customer) into a fully-automated grocery delivery service whereby the customer need not even log on to select desired purchases.

The historical transaction data may be or include data regarding the customer's banking transaction history may be used as an indication of particular trends regarding the customer's finances. The transaction history may also indicate whether the customer will be open to the type of recommendations being considered, particularly if the customer has accepted similar recommendations in the past. In another example, the customer's historical transaction history is analyzed over time for spending trends to determine that the customer is currently trending upward on spending, thereby potentially indicating a greater probability that the customer will accept a recommendation from a particular merchant. In various other embodiments, other pieces of historical transaction data and/or other types of data are used to determine which customers to whom recommendations should be made.

Recent transaction data 205 may be retrieved from, for example, a financial institution back-end system or server or group or systems or servers. Such recent transaction data may indicate that a potential customer has made one or more recent purchases at one or more merchants. The data may also include location information associated with the one or more merchants, so that the system of the invention may glean from the recent transaction history the location of the merchants from which the customer has recently shopped, and thereby may infer the current position of the customer. Of course, as the period of time since the last transaction occurred increases, the predicted location of the customer loses accuracy. Thus, the most recent transaction data is typically used to predict the current location of the customer. In fact, simultaneously to or substantially simultaneously to conducting a transaction, the financial institution's systems may determine the location of the merchant conducting the transaction with the customer and thereby determine the current location of the customer at or soon after completion of the transaction.

The data corresponding to the customer may include global positioning data 210. Global positioning data may include any information collected from methods, systems, apparatus, computer programs etc. involving locating a user's position relative to satellites, fixed locations, beacons, transmitters or the like. In some instances, global positioning data may be collected from a GPS device, such as a navigation system. Such a navigation system may be, but is not limited to, hardware and/or software that is part of a mobile phone, smartphone, PDA, automobile, watch etc. or a commercially available personal navigation system such as a Garmin®, TomTom® or the like. The amount, nature and type of the global positioning data that is collected may depend on the merchant's relationship with the customer and the amount of information that the customer has authorized the merchant or third-party provider to collect. For instances, in some embodiments the global positioning data will be snapshots of the user's location at different times. For example, a snapshot of the user's location will be collected each time the GPS software, navigation system or application is activated. In such embodiments, the global positioning data may only provide historical information regarding the customer's location (e.g. at 9:30 a.m. the customer activated the GPS software and was at location X). Such historical positioning data may be used to estimate the customer's current position, such as determining a range of distances the customer may have traveled in the intervening time. Alternatively, the global positioning data may be combined with other positioning data to locate the customer's current position. In other instances, the global positioning data may dynamically provide information regarding the customer's current location as the customer moves from location to location. In such instances, additional positioning data may not be necessary to project the route of the customer or can be used to confirm the customer is traveling along the suggested route.

Data corresponding to the customer may include mobile device data. Mobile device data may include information regarding the current location of the customer's mobile device or a variety of other data. Such a mobile device may include, but is not limited to, a cellular telecommunications device (i.e., a cell phone or mobile phone), personal digital assistant (PDA), smartphone, a mobile Internet accessing device, or other mobile device including, but not limited to portable digital assistants (PDAs), pagers, gaming devices, laptop computers, tablet computers, and any combination of the aforementioned, or the like. For instance, the current location of a mobile phone may be dynamically determined from the cell phone signal and cell towers being accessed by the mobile phone. In other instances, a mobile device may include software or hardware to locate the position of the mobile device from GPS signals, wireless network locations, and the like. Furthermore, mobile device data may be the time and location of calls placed using the telephone functionality of a mobile device. By way of example, if a customer purchases a cup of coffee at a local coffee house, and thereby triggers an indication of a point-of-sale transaction, a merchant may be able to locate the customer if the customer logs onto a wireless network at the coffee house (for instance by locating the IP address associated with the wireless network). In yet other embodiments, the mobile device data may be data collected and analyzed by the hardware and/or software of the mobile device concerning the surrounding environment. In such embodiments, hardware, such as a video capture device, camera or the like and software that is stored in the memory of a mobile device captures a video stream of the environment surrounding the mobile device and through object recognition, compass direction, the location of the mobile device, and other such data identifies information about the objects identified in the surrounding environment and/or the environment itself. For example, in use, a user may use the camera built into her smartphone to collect a real-time video stream that includes images of the façade of a store front and the surrounding area. This image may include the store's name from a marquee, a street address (collected from an image of the numbers on the building and of street signs in the video image) and the direction the smartphone is facing (from a compass in the mobile device). Such information may be sufficient to locate the user's position.

Data corresponding to the customer may also be collected from social network data 230. It will also be understood that "social network" as used herein, generally refers to any social structure made up of individuals (or organizations) which are connected by one or more specific types of interdependency, such as kinship, friendship, common interest, financial exchange, working relationship, dislike, relationships, beliefs, knowledge, prestige, geographic proximity etc. The social network may be a web-based social structure or a non-web-based social structure. In some embodiments, the social network may be inferred from financial transaction behavior, mobile device behaviors, etc.

The social network may be a network unique to the invention or may incorporate already-existing social networks such as Facebook®, Twitter®, FourSquare®, Linkedin®, YouTube® as well as any one or more existing web logs or "blogs," forums and other social spaces. Social network data may indicate the customer's recent, present or future purchases, interests, connections, influence, location and/or the like through expressed data. For instance, a user may upload a blog post, comment on a connection's page, send a friend an electronic message etc. that identifies the customer's interests or location (e.g. micro-blog entry "Just enjoyed lunch at a new restaurant on $5^{th}$ street . . . check it out."). Moreover, many already-existing social networks provide users with the ability to "check-in", "flag" or otherwise indicate the user's current location. Accordingly, customer positioning data collected from social networking data may consist of such indications. Furthermore, many social networks allow users to rate, like, comment etc. on restaurants, attractions, locations and the like. Accordingly, a customer may indicate that he ate at a certain restaurant or business at a given time and thereby provide information about his location at that time. Furthermore, a customer may upload photographs to a social networking site and thereby provide information about the customer's location. In some instances the customer's location may be determined from the picture, (for example a picture of a state line sign, a highway sign, a mile marker etc.) or a caption associated with the picture may indicate the customer's location and/or the time the photo was taken. As with the global positioning data, if the social network data only includes historical location data, the social network data may be used to estimate the customer's location or be combined with other positioning data to locate the customer. As noted above, social network data includes, but is not limited to, postings, comments, profile information, blog entries, micro-blog entries, updates, communications, photos, chat transcripts etc. Such information may directly provide information regarding the customer's purchasing preferences. For instances, a customer may "like" a certain merchant's Facebook® page or follow a certain merchant's Twitter® feed. Moreover, as discussed above, if a customer uses features of social networking sites, such as checking-in, that identify where the user has been, this information may provide further information regarding the businesses that the customer frequents. Photos uploaded to social networking sites may similarly illustrate preferences. By way of example, software that includes object recognition may be able to determine the brand names of clothing that the customer is wearing and conclude that the customer likes these brands. Also, photographs of locations may provide information regarding where the customer goes etc.

Data corresponding to the customer may also be collected from Internet data. Internet data, may include any information relating to the searches conducted by the customer, website's visited by the customer and the like that suggests the customer's present or future trends in purchasing, interests, location(s) and/or the like. For instance, a customer may review an online menu for a restaurant prior to visiting the restaurant. Similarly, a customer may search for current sales being offered prior to visiting a store. A customer may also search for construction or traffic reports indicating planned travel along certain roads. It will be understood that such Internet data may relate to searches or websites visited by the customer before the indication of the POS transaction (e.g. while the customer is still at home or work), however, inasmuch as many mobile devices also include mobile Internet connectivity, it will also be understood that such information may be dynamically collected as the customer moves from location to location.

In various embodiments, the various types of data may be data that is available directly to a financial institution, merchant, or data that is collected by other entities or a third-party service provider and then provided to the merchant.

Transactional data may include, but is not limited to, data regarding the date, location, amount, method of payment etc. of the transactions of the customer. The transactional data may be historical transaction data or may be data relating to the transaction that is the subject of the POS transaction. It will be understood that such data may illustrate patterns of purchases that may be predictive of a customer's purchasing behaviors. For instance, transactional data may indicate that a customer regularly buys coffee from coffee shops. Accordingly, the customer may be receptive to offers for discounts to coffee. Moreover, the transactional data may indicate that the customer does not generally eat out in restaurants, and consequently, may be more receptive to offers for discounts to a local supermarket then offers relating to a local restaurant. Moreover, transactional data may indicate patterns of behavior relating to where a customer shops. For instance, available transactional data may indicate that a customer routinely stops at the same gas station once every two weeks. Such information may be useful to a merchant targeting offers to this customer. For example, if a competing gas station is interested in capturing the customer's business the size of the offers or discounts it may be required to offer the customer to have her change her purchasing routine may be more substantial than if the offer was based solely on the distance the customer has to travel to reach the competing gas stations' location.

Data corresponding to the customer may be or include biographical data. Biographical data includes, but is not limited to, the age, sex, marital status, place of residence, current location, number of children, employment status etc. of a customer. Such data may be available to a merchant based on the merchant's prior dealings with the customer, through account applications, loyalty programs, and the like. For instance, a financial institution may have access to biographical data from a customer's earlier mortgage application. Similarly, a retailer may have access to biographical data from the customer's enrollment in the retailer's rewards program. In use, such information may be helpful in targeting offers to a customer by limiting offers to those that are generally appropriate for one with similar biographical data. For instance, if a merchant knows through a retail credit card application that the customer is 19 years old and a college student, an offer for a luxury hotel and spa may not be appropriate unless other data indicates the customer has significant income. However, an offer for a budget motel, a local night club or pizza restaurant may be appropriate. Similarly, if a merchant has access to data indicating the customer has two small children, offers for family friendly events may be more likely to be accepted by the customer than offers for events intended for couples only.

The data corresponding to the customer may also be collected from publicly available data. While potentially related to social networking data to the extent the publicly available data is found online, this information may also include information that others have written about the customer, such as news articles, birth announcements, marriage announcements, job promotions, recordation of deeds or other legal documents, marriage or birth certificates etc. Moreover, such information may include reviews that the customer has left regarding goods and services. For instance, if a customer reviews a product or service online, this review may be publicly available and may provide insight into the customer's purchasing preferences.

Each of the different types of data available to the system may be leveraged to identify potential issues and/or choose recommendations to be communicated to the customer.

Figure 3:
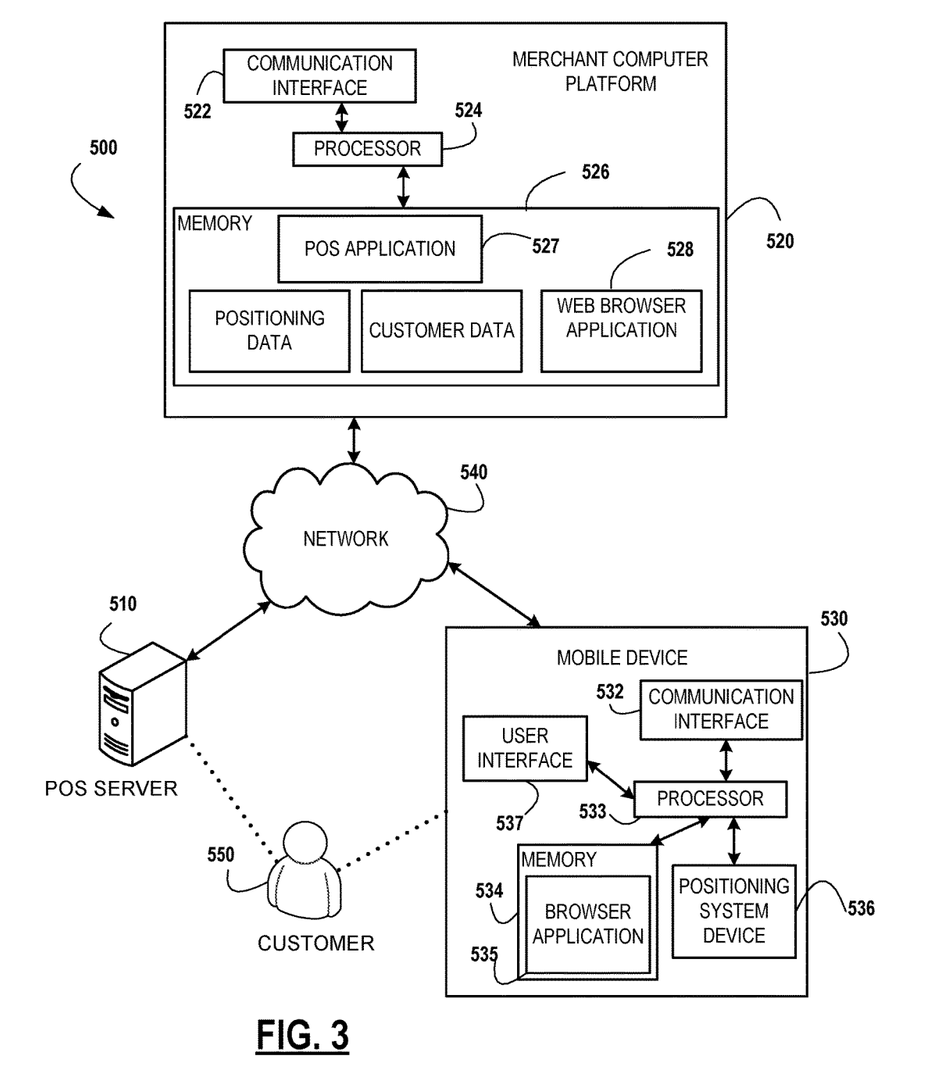
FIG. 3 provides a block diagram illustrating technical components of a system for analyzing historical events to determine potential catalysts and automatically generating and implementing mitigation, in accordance with embodiments of the present invention.

FIG. 3 provides a block diagram illustrating technical components for a system 500 for analyzing historical events to determine potential catalysts and automatically generating and implementing mitigation, in accordance with an embodiment of the present invention. As illustrated, the system 500 includes a POS server 510, a merchant computer platform 520, a mobile device 530, a network 540 and a customer 550. It will be understood that the customer 550 has access to the mobile device 530.

In some embodiments, the POS server 510 may be operatively and selectively linked to the merchant computer platform 520 over the network 510. As illustrated, some embodiments of the merchant computer platform 520 may include a POS application 527 configured to receive indications of point-of-sale transactions from the POS server 510.

As shown in FIG. 3, the POS server 510, merchant computer platform 520 and mobile device 530 are each operatively and selectively connected to the network 540, which may include one or more separate networks. In addition, the network 540 may include a local area network (LAN), a wide area network (WAN), and/or a global area network (GAN), such as the Internet. It will also be understood that the network 540 may be secure and/or unsecure and may also include wireless and/or wireline technology.

The mobile device 530 may include any computerized apparatus that can be configured to perform any one or more of the functions of the mobile device 530 described and/or contemplated herein. As shown in FIG. 5, in accordance with some embodiments of the present invention, the mobile device 530 includes a communication interface 532, a processor 533, a memory 534 having a browser application 535 stored therein, a positioning system device 536, such as a GPS device, and a user interface 537. In such embodiments, the communication interface 532 is operatively and selectively connected to the processor 534, which is operatively and selectively connected to the user interface 537, the memory 534 and the positioning system device 536.

The user interface 538, which may allow the mobile device 530 to receive data from the customer 550, may include any of a number of devices allowing the mobile device 530 to receive data from the customer 550, such as a keypad, keyboard, touch-screen, touchpad, microphone, mouse, joystick, stylus, other pointer device, button, soft key, and/or other input device(s). In some embodiments, the user interface 538 also includes one or more user output devices, such as a display and/or speaker, for presenting information to the customer 550.

Each communication interface described herein, including the communication interface 532 and 522, generally includes hardware, and, in some instances, software, that enables a portion of the system 500, such as the processor 533 to transport, send, receive, and/or otherwise communicate information. For example, the communication interface 532 of the mobile device 530 may include a modem, server, electrical connection, and/or other electronic device that operatively connects the mobile device 530 to another electronic device, such as the electronic devices that make up the merchant computer platform 520.

Each processor described herein, including the processor 533 and 524, generally includes circuitry for implementing the audio, visual, and/or logic functions of that portion of the system 500. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as the memory 534 of the mobile device 530 and the memory 526 of the merchant computer platform 526.

Each memory device described herein, including the memory 536 for storing the browser application 535 and other data and/or programs, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 3, the memory 534 includes a browser application 535. The browser application 535 may be used by the customer 550 to conduct Internet searches and/or access online social networks over the network 540. In some embodiments, the browser application 535 includes computer-executable program code portions for instructing the processor 534 to perform one or more of the functions of the browser application 535 described and/or contemplated herein. In some embodiments, the browser application may be configured to a collect and transmit through the communication interface data collected from the Internet searches conducted by the customer 550 and/or the social network data accessed using the mobile device 530. In some embodiments, the browser application 535 may include and/or use one or more network and/or system communication protocols.

It will be understood that the mobile device 530 can be configured to implement one or more portions of the process flows described and/or contemplated herein. For example, in some embodiments, the user interface apparatus 530 is configured so that the communication interface 532 is operatively and selectively linked to the merchant computer platform 520 to provide positioning data of the customer 550. For instance, the positioning system device 536 and/or the browser application 535 may provide global positioning data 210, social networking data 230 and Internet search data 230 to the merchant computer platform to be processed 520 to determine the customer's current location. The processor 533 or some other apparatus of the mobile device 530 may be configured to collect and transmit the mobile device data 220 to the merchant computer platform 520. Similarly, the mobile device 530 may be used to collect and provide some, or all, of the data corresponding to the customer as discussed above.

FIG. 3 also illustrates a merchant computer platform 520, in accordance with an embodiment of the present invention. The merchant computer platform 520 may include any computerized apparatus that can be configured to perform any one or more of the functions of the merchant computer platform 520 described and/or contemplated herein and/or may represent a financial institution server or servers. In accordance with some embodiments, for example, the merchant computer platform 520 may include an engine, a platform, a server, a database system, a front end system, a back end system, a personal computer system, and/or the like. In some embodiments, such as the one illustrated in FIG. 3, the merchant computer platform 520 includes a communication interface 522, a processor 524 and a memory 526. In some embodiments, as illustrated in FIG. 3, a POS application 527 and web browser application 528 may be stored in memory 526. Moreover, in certain embodiments the positioning data and customer data collected in accordance with the process flows described and/or contemplated herein may be stored in memory 526 for access by the processor 524. The communication interface 522 is operatively and selectively connected to the processor 524, which is operatively and selectively connected to the memory 526.

In some embodiments, the processor 524 (and/or the processor 533) may also be capable of operating one or more applications, such as one or more applications functioning as an artificial intelligence ("AI") engine. The processor 524 may recognize, by way of the AI engine, locations, product or service offers etc. that it has previously communicated to the customer as well as the customer's response to the communicated offers (e.g. whether the offer was accepted, rejected or the customer provide additional information etc.). In this way, the processor may recognize locations, offers and the like and store information related to the locations, offers etc. in one or more memories discussed herein, such as memory 526. Once the AI engine has thereby "learned" of common locations, offers and the customer's response to such offers, the AI engine may run concurrently with and/or collaborate with other modules or applications described herein to perform the various steps of the methods discussed. For example, in some embodiments, the AI engine recognizes an offer that appears correlated to the customer's location and customer data but that the customer has routinely rejected in the past. The AI engine may then communicate to another application or module of the merchant computer platform 520, an indication that an alternate offer should be identified. In this regard, the AI engine may provide a baseline or starting point from which to determine offers of goods or services to be communicated to the customer.

As shown in FIG. 3, the memory 526 includes a browser application 528. The browser application 528 may be used by the merchant computer platform 520 to conduct Internet searches for publicly available data and/or access online social networks over the network 540 consistent with the process flows discussed herein in connection with collecting positioning data and/or customer data. In some embodiments, the browser application 528 includes computer-executable program code portions for instructing the processor 524 to perform one or more of the functions of the browser application 528 described and/or contemplated herein. In some embodiments, the browser application 528 may include and/or use one or more network and/or system communication protocols.

It will be understood that the merchant computer platform 520 can be configured to implement one or more portions of the process flows described and/or contemplated herein. For example, in some embodiments, the merchant computer platform 520 is configured so that the communication interface 522 is communicatively linked to the mobile device 530 to collect the data. In certain embodiments the web browser application 528, stored in the memory 526 of the merchant computer platform 520 is operatively linked to the network

540 through the communication interface 522 to collect customer data. In some embodiments, POS application 527 stored in the memory 526 of the merchant computer platform 520 is configured to receive an indication of a point-of-sale transaction from the POS server 510 and the processor 524 is configured to use the indication of the point-of-sale transaction along with the positioning data and customer data to choose offers. Consistent with certain embodiments, the merchant computer platform 520 is configured to communicate offers to the customer 550. In some embodiments, the communication of offers will be facilitated by the communication interface 522 communicatively linking over the network 540 with the mobile device 530 to transmit the offer. Similarly, in certain embodiments, the communication interface 522 will be configured to receive information from the customer 550 relative to the customer's location or the offer(s) communicated to the customer 550.

It will be understood that the embodiment illustrated in FIG. 3 is exemplary and that other embodiments may vary. For example, in some embodiments, some of the portions of the system 500 may be combined into single portion. Specifically, in some embodiments, the merchant computer platform 520 is configured to perform some of the same functions of those separate portions as described and/or contemplated herein. Likewise, in some embodiments, some or all of the portions of the system 500 may be separated into two or more distinct portions.

In various embodiments, the system may present to the customer one or more predicted scenarios that are predicted based on one or more proposed actions the system may recommend to the customer to mitigate an issue. For example, one scenario involving a recommended action may be to increase savings every month for a year in order to achieve the amount of regular savings the customer used to collect. For example, the system may suggest to the customer that the customer save $100 the first month, $200 the second month, $300 the third month, $400 the fourth month and $500 the fifth month in order to slowly achieve a level of $500 a month of savings. This level of savings may have previously been made by the customer, and the system may recognize the customer's previous level of $500 savings a month based on historical transaction data or other data available to the system.

In some embodiments, the system may allow the customer to provide preferences for the scenarios presented to the customer. For example, the system may enable the customer to specify that the customer prefers the cheapest option, the fastest option, the best balance between the cheapest and fastest option or otherwise. In some cases, the system enables the customer to establish these preferences before implementation of the system and in some cases, the system enables the customer to provide these preferences "on-the-fly" or during operation of the system.

In some embodiments, the system may provide the customer a scenario that predicts the financial future for the customer based on the current trends and, in some cases, the system may compare that prediction to one or more proposed recommendations and their corresponding predicted scenarios.

In some embodiments, the system may provide the customer a level of amount-over-threshold protection for one or more of the customer's accounts. This level of amount-over-threshold protection may be leveraged (or supported) by the historical transaction data and the trends of the customer's spending and/or savings. For example, if the customer is trending up on savings and/or trending down on expenses, then the customer's level of amount-over-threshold protection may increase. If the opposite is true, then the customer's level of amount-over-threshold protection may decrease.

In various embodiments, the system may request the customer to opt-in to one or more of the processes discussed herein. For example, prior to collecting the historical transaction data, analyzing it for trends and preparing recommendations, the system may provide an opt-in message to the customer. Once the customer opts-in to the system, then the processes may proceed. In some embodiments, the system provides an opt-in for sub-sets of the processes discussed herein. For example, the system may provide an opt-in for both the data collection as well as a separate opt-in for the recommendation generation. In some cases, the system may provide automatic mitigation, that is, automatic implementation of actions intended to correct a potential issue identified by the trends of the customer's data. In such cases, the customer may opt-in to such automatic mitigation or may opt-in to some level of automatic mitigation. For example, the customer may opt-in to mitigation involving movement of money less than an indicated threshold. The customer may opt-in to automated mitigation of a savings gap of less than $100, for example. The customer may be enabled to modify the threshold amount, how often it is applied, and any scenarios where the customer would like to receive notification and/or an opportunity for providing confirmation of the automated action before it is taken.

In some such embodiments wherein the customer is provided some preferences or opting-in to one or more features discussed herein, the system may provide one or more opportunities for the customer to provide preferences before implementation of the processes discussed herein or "on-the-fly", that is, during operation of one or more of the processes discussed herein.

In various embodiments, the potential issue, rather than a problem, is an opportunity. For example, the system may recognize that the customer has a significantly higher amount of money being deposited into her checking account than is being saved. In fact, it may be that the checking account is regularly increasing in available amount. This provides a potential opportunity for the customer to save more money. Thus, the system may present this opportunity to the customer for consideration.

In some embodiments, the ranked potential causes of the potential issue are presented to the customer serially, that is, the highest ranked (i.e., most likely) cause is presented to the customer first for confirmation, and if the customer indicates that the cause is inaccurate, then the system may present the next-highest ranked cause and so on.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present invention may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While certain exemplary embodiments have been described and shown in the accompanying drawings, it is to be understood that such embodiments are merely illustrative of, and not restrictive of, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for analyzing historical events to determine potential catalysts and automatically generating and implementing mitigation, the system comprising:
   a plurality of customer data sources;
   a hub computer apparatus including a first processor, a first memory device, and a first communication device, wherein the hub computer apparatus is a hub to the plurality of data sources which are configured in spoke arrangement to the hub;
   a spoke control apparatus including a second processor, a second memory device and a second communication device, wherein the spoke control system is in communication with the plurality of data sources and the computer apparatus; and
   a software module stored in the memory, comprising computer-readable instructions that when executed by the at least one of first and second processor cause the first and second processor to:
      collect, from the plurality data sources, historical event data associated with a customer, wherein collecting data comprises:
         detecting, by the spoke control apparatus, that historical event data associated with the customer is available at one of the plurality of customer data source;
         sending control signals to the hub computer apparatus for establishing a dedicated communication channel;
         selecting, by the hub computing apparatus, one or more network systems for a dedicated communication channel, wherein the selection is based on a functioning category assigned to each of a plurality of network systems;
         implementing the one or more selected network systems to establish a dedicated communication channel between the hub computer apparatus and the one of the plurality of data sources; and
         communicating the historical event data associated with the customer over the dedicated communication channel;
      determine a potential issue with a customer's finances based on the historical event data;
      correlate the potential issue with one or more causes of the potential issue by applying a correlation algorithm to the collected data to establish at least one nexus between the collected data and the potential issue, wherein the correlation algorithm is configured to determine whether circumstances corresponding to the collected data are likely to cause the potential issue, thereby resulting in:
         (1) at least one likelihood of causation, each likelihood of causation corresponding to (i) only one of the at least nexuses, and (ii) a collected-data-potential-issue pair, and
         (2) a level of causation corresponding to (i) all of the at least one nexuses, and (ii) the collected-data-potential-issue pair; and
      in response to the correlation, initiate mitigation of the issue by automatically implementing one or more computerized actions intended to correct the potential issue.

2. The system of claim 1, wherein the computer-readable instructions when executed by the processor further cause the processor to:
   rank the possible causes of the potential issue; and
   present the possible causes to the customer for consideration.

3. The system of claim 2, wherein the computer-readable instructions that when executed by the processor cause the processor to:
   receive the customer's confirmation of the possible causes.

4. The system of claim 1, wherein the computer-readable instructions that when executed by the processor cause the processor to:
   initiate communication of one or more recommendations for mitigating the potential issue to the customer.

5. The system of claim 4, wherein the computer-readable instructions that when executed by the processor cause the processor to:
receive the customer's approval of at least one recommendation; and
initiate mitigation of the issue based on the at least one approved recommendation.

6. The system of claim 1, wherein the likelihood of causation corresponds to one of the at least one nexuses and the level of causation represents a combination of each of the at least one likelihoods of causation.

7. A computer program product for analyzing historical events to determine potential catalysts and automatically generating and implementing mitigation, the computer program product comprising at least one non-transitory computer-readable medium having computer-readable program code portions embodied therein, the computer-readable program code portions comprising:
an executable portion configured to collect, from a plurality data sources, historical event data associated with a customer by: (i) detecting that historical event data associated with the customer is available at one of the plurality of customer data source, (ii) in response to detecting, sending control signals for establishing a dedicated communication channel, (iii) selecting one or more network systems for a dedicated communication channel, wherein the selection is based on a functioning category assigned to each of a plurality of network systems, (iv) implementing the one or more selected network systems to establish a dedicated communication channel, and (v) communicating the historical event data associated with the customer over the dedicated communication channel;
an executable portion configured to determine a potential issue with a customer's finances based on the historical event data;
an executable portion configured to correlate the potential issue with one or more causes of the potential issue by applying a correlation algorithm to the collected data to establish at least one nexus between the collected data and the potential issue, wherein the correlation algorithm is configured to determine whether circumstances corresponding to the collected data are likely to cause the potential issue, thereby resulting in:
(1) at least one likelihood of causation each corresponding to (i) only one of the at least nexuses, and (ii) a collected-data-potential-issue pair, and
(2) a level of causation corresponding to (ii) all of the at least one nexuses, and (ii) the collected-data-potential-issue pair; and
an executable portion configured to, in response to the correlation, initiate mitigation of the issue by automatically implementing one or more computerized actions intended to correct the potential issue.

8. The computer program product of claim 7, wherein the computer-readable program code portions further comprise:
an executable portion configured to rank the possible causes of the potential issue; and
an executable portion configured to present the possible causes to the customer for consideration.

9. The computer program product of claim 8, wherein the computer-readable program code portions further comprise:
an executable portion configured to receive the customer's confirmation of the possible causes.

10. The computer program product of claim 7, wherein the computer-readable program code portions further comprise:
an executable portion configured to initiate communication of one or more recommendations for mitigating the potential issue to the customer.

11. The computer program product of claim 10, wherein the computer-readable program code portions further comprise:
an executable portion configured to receive the customer's approval of at least one recommendation; and
an executable portion configured to initiate mitigation of the issue based on the at least one approved recommendation.

12. The computer program product of claim 7, wherein the likelihood of causation corresponds to one of the at least one nexuses and the level of causation represents a combination of each of the at least one likelihoods of causation.

13. A method for analyzing historical events to determine potential catalysts and automatically generating and implementing mitigation, the method comprising:
collect, by a computing device processor, from a plurality data sources, historical event data associated with a customer by: (i) detecting that historical event data associated with the customer is available at one of the plurality of customer data source, (ii) in response to detecting, sending control signals for establishing a dedicated communication channel, (iii) selecting one or more network systems for a dedicated communication channel, wherein the selection is based on a functioning category assigned to each of a plurality of network systems, (iv) implementing the one or more selected network systems to establish a dedicated communication channel, and (v) communicating the historical event data associated with the customer over the dedicated communication channel;
determining, by a computer processing device, a potential issue with a customer's finances based on the historical event data;
correlating, by the computer processing device, the potential issue with one or more causes of the potential issue by applying a correlation algorithm to the collected data to establish at least one nexus between the collected data and the potential issue, wherein the correlation algorithm is configured to determine whether circumstances corresponding to the collected data are likely to cause the potential issue, thereby resulting in at least one likelihood of causation each corresponding to only one of the at least nexuses and a collected-data-potential-issue pair and a level of causation corresponding to all of the at least one nexuses and the collected-data-potential-issue pair; and
in response to the correlation, initiating, by the computer processing device, mitigation of the issue by automatically implementing one or more computerized actions intended to correct the potential issue.

14. The method of claim 13, further comprising:
ranking the possible causes of the potential issue; and
presenting the possible causes to the customer for consideration.

15. The method of claim 14, further comprising:
receiving the customer's confirmation of the possible causes.

16. The method of claim 13, further comprising:
initiating communication of one or more recommendations for mitigating the potential issue to the customer.

17. The method of claim 13, further comprising:
receiving the customer's approval of at least one recommendation; and initiating mitigation of the issue based on the at least one approved recommendation.

18. The method of claim 13, wherein the likelihood of causation corresponds to one of the at least one nexuses and the level of causation represents a combination of each of the at least one likelihoods of causation.

\* \* \* \* \*